Patented Mar. 28, 1933

1,903,172

UNITED STATES PATENT OFFICE

LEO W. EILERTSEN, CHARLES N. CONE, GLENN DAVIDSON, IRVING F. LAUCKS, AND HARRY P. BANKS, OF SEATTLE, WASHINGTON, ASSIGNORS TO I. F. LAUCKS INC., OF SEATTLE, WASHINGTON, A CORPORATION OF WASHINGTON

PROCESS OF PREPARING SOYA BEAN PROTEIN CONTAINING MATERIAL FOR THE MANUFACTURE OF AN ADHESIVE, AND THE PRODUCT THEREOF

No Drawing. Application filed June 14, 1926. Serial No. 116,010.

Our invention relates to the process of preparing soya bean protein containing material for the manufacture of an adhesive.

In United States Letters Patent Numbers 1,689,732 and 1,757,805, there have been described processes of making glues, adhesives, sizing material and the like from vegetable proteins and vegetable protein containing materials. We have found, however, that in respect to one of these vegetable protein containing materials, namely, soya bean flour or flour ground from soya bean cake, which is the residue remaining from the soya bean after a portion or all of the oil has been removed, certain new and useful properties are imparted to soya bean flour by means of heat treatment of the same before it is admixed with the chemicals commonly used. By the term soya bean flour we mean subdivided soya bean from which bean the natural oil has been removed in whole or in part by mechanical operation or by solvents.

We believe that such heat treatment causes partial coagulation of the protein material and, in fact, it is stated by other investigators of soya bean material that certain constituents of the soya bean protein are coagulated by heat, the amount of coagulation being dependent on the degree of heat and the duration of the heat.

It will be understood that in the milling of soya beans to extract oil and make pressed cake, a certain amount of heat is used. The heating is in general by two different methods. In making the so-called round cake or "cartwheel" cake, the heating is with live steam on the crushed beans for about one minute, or at least for a very short period of time. In making the flat cake known as "English style cake", which is further exemplified as the standard product of the Anglo Chinese Eastern Trading Co., it is understood, the heating is accomplished by cooking the beans at a temperature between approximately the boiling point of water, (about 212° Fahrenheit) to two hundred and seventy degrees Fahrenheit (270° F.), for an hour or more. In each case, after the heating process, the beans are placed in a suitable container and subjected to pressure to extract the oil and form the cake. It will be seen, therefore, that the beans are subjected to quite different treatments in the two processes which result in the two styles of cake. We find in practice that there is a great difference between the flours made from the two kinds of cake as far as their value and adaptability for making adhesives is concerned.

The so-called "cartwheel" cake of commerce is very irregular in quality and condition of protein and is quite liable to mold and still further impair its usefulness for adhesive purposes. This tendency to deteriorate in storage and during transportation is due in part at least to the high moisture content (15% to 17%). The "English style" cake, as described above, or the meal obtained by coarse grinding of same, however, is quite uniform in condition of the protein content, the moisture content is lower, being eight to ten percent and oil content approximately six percent. This cake keeps well in storage and during transportation. When "cake" is hereinafter noted in this application we refer to this "English-style" pressed soya bean cake.

At times we find even this cake to have a degree of non-uniformity in condition of the protein due to a degree of heating of the beans or cake which is greater or less than the average. We find for example some cake that is in a condition that we call semi-processed; it is to be understood, however, that what we term "semi-processed cake" has nevertheless been subjected to the action of heat, and the protein constituents, as compared to those of raw beans, has, of course, been much changed or coagulated. However, we term flour from such cake "semi-processed flour" to distinguish it from other flours which, as we can determine by tests, have been subjected to greater degrees of heat.

We have found that adhesives made from what we term "semi-processed" flour are quite inferior. When the dry glue powder composed of such flour as a base, together with the other ingredients comprising the formula, is mixed with water the resulting glue or adhesive is very lumpy and hard or impossible to mix uniformly. At the same time it has a great tendency to foam considerably in mechanical mixers and spreaders. Foam, of course, ruins glue or at least greatly impairs the strength of the bond.

We have determined that if we start with semi-processed flour which has the extremely undesirable properties described above and subject such flour to heat, we then correct these defects and produce a flour which, when mixed in accordance with our regular formulæ set forth in the above named applications, will make a good adhesive or glue. The amount of heating to which the semi-processed flour is subjected in such a process depends upon the degree of heating which the cake, from which the flour is made, has previously received. As this necessary heat treatment varies somewhat in amount or degree with different lots or shipments of flour received, we have contrived certain tests which we apply to the flour to determine its degree of "semi-processing". We then adjust the heat treatment, both as to degree of temperature and length of time, so as to produce flour containing protein coagulated to the proper degree.

One of the tests is what we term the absorption test: Twenty (20) grams of flour are mixed with twenty (20) grams of water and the mass kneaded into a small pat. This pat when so made must not be too sticky, but at the same time should have an appreciable degree of stickiness. As a measure of this stickiness we would say that it is just sufficient to pick up a fifty gram brass weight having an area of one square inch but it should not hold such weight for more than a few seconds. Also the mass is made into a round ball and dropped from a height of three feet to a wood surface. It should not flatten out to any extent but should keep its spherical shape and be practically on the point of showing a slight rebound. If the pat as above prepared will not pick up the weight, but is crumbly and mealy, then it is processed too much for our purposes, i. e., it has been heated too much. If it is too sticky, then it is processed insufficiently. The pat test determines all heat up to the time of the expression of the oil and drying and milling and processing in the presence of live steam. If at the end of the processing, the pat test shows that it is processed insufficiently, then it is reheated to the requisite amount.

We are also able to judge as to the amount of heating to which a flour has been subjected and the further amount required by the smell, although this characteristic is very difficult to describe in words. The flour used in making the absorption or pat test above described has the "green" odor probably best described as suggesting new mown alfalfa hay. Heating makes this odor less pronounced and imparts a cooked odor.

Further, of course, as noted above, we are able to determine the state of the flour by the action of the glue mixture, made with the flour as a base, in the mechanical or hand mixers, i. e., whether it foams or not. If it foams considerably, then it is processed insufficiently, and more heat is applied.

The results of these tests which we have established determine whether the flour should be subjected to further heating and the degree of such heating which is required. It might conceivably occur that the flour might be used without further heating but this, according to our experience, would be a very unusual occurence.

Sometimes we find soya bean flour which has been heated in the milling to such an extent that it has passed the definite degree of change of the protein and other ingredient and as a result does not produce good adhesive, although in such cases the defects are different from those of under-heated flour.

We will now define our process of heat treatment of soya bean protein containing material.

The English style soya bean cake, which contains approximately nine percent moisture, is first fed into a breaker and thence to a "hog" or crusher, the product from which is a coarse meal. This meal is conveyed to a rotary drum drier which is operated with forty pounds of steam jacket pressure and the meal is heated thereby to a temperature of approximately one hundred seventy-two degrees Fahrenheit.

From the drier the meal runs by gravity into a cooler which agitates the meal and permits the heat to escape. The meal is sacked off from the cooler at a temperature of approximately one hundred and twenty-two degrees Fahrenheit, and it is allowed to stand in sacks for from twenty-four to thirty-six hours to permit of gradual and complete cooling to room temperature.

The cool meal is fed to an attrition mill, the action of which develops very little heat in the meal. From the attrition mill the meal passes through two sets of sharp rolls, which reduce the coarse materials to fines and reject the bran or hulls of the beans.

The fines are then fed to a stone burr mill which reduces approximately eighty-five percent (85%) of the material to flour which will pass a bolting cloth of eighty mesh. This material which passes through eighty mesh screen is considered as our semi-processed flour referred to heretofore.

This semi-processed flour consists approximately of the following:

|  | Per cent |
|---|---|
| Moisture | 6.00 |
| Proteins | 46.50 |
| Fat | 8.00 |
| Fibre | 1.75 |

The semi-processed flour is then passed through a four unit steam jacketed heater by means of screw conveyors. Each unit of this heater is six inches inside diameter and approximately eleven feet in length. Into the first unit of this heater live steam is injected in the quantity which will pass a one-quarter (¼) inch needle valve adjusted to 3 turns, equivalent to an orifice of approximately 0.025 square inches and under a steam pressure of thirty pounds (30 lbs.). This adjustment may vary slightly, depending upon the rate of feed and the condition of the flour as determined by the tests hereinbefore noted. On the above adjustment, satisfactory results are obtained when the flour is passing through the four units at the rate of one hundred pounds every four minutes. This form of heater, we have found, gives the best results, but of course we do not limit ourselves to any such definite heater.

The heater is operated with eighty pounds of steam, and the temperature of the flour as it leaves the heater is approximately one hundred ninety degrees Fahrenheit.

The flour leaving the heater is reground through a hammer-mill which also facilitates cooling. When sacked, the flour has a temperature of approximately one hundred forty degrees Fahrenheit. The flour may be used at once in mixing certain formulæ for adhesives but the greater part is allowed to stand in sacks for from two to seven days to cool and age naturally. By the term "aging" as herein used is meant the application of heat over a period of time as well as raising the temperature to a desired degree.

The product resulting at this point is known as "heat treated flour" or "processed flour".

The further treatment of flour and other ingredients of the soya bean adhesives from this point may be any one or a combination of both of the following processes:

The cold "processed flour" may be used directly as the principal ingredient in a formula such as, for instance, the following:

|  | Parts |
|---|---|
| "Processed flour" | 300 |
| Sodium fluoride | 22½ |
| Sodium carbonate | 30 |
| Hydrated lime | 65 |
| Boric acid | 10 |

These ingredients are thoroughly mixed in dry form in a batch mixer and sacked off ready for use as dry glue powder, water being added when finally prepared for use.

The warm "processed flour" or cold "processed flour" may be mixed with other ingredients and set aside to heat naturally after which the product is reground, mixed with the remaining ingredients of the formula and sacked off as finished glue powder. This is known as the "natural aging process." The aging may be accelerated by further use of artificial heat applied to the product comprising the "processed flour" and other glue ingredients.

At this point we may further exemplify and clearly point out the details of our invention by giving as an example a formula and a system of procedure:

"English style" soya bean cake ground to coarse meal.

Meal to drier operating under forty pounds of steam, bringing meal to temperature of 172° Fahrenheit approximately.

Meal run from drier to cooler and sacked.

Temperature of meal in sacks,—122° Fahrenheit approximately.

Meal cooled to approximately 70° Fahrenheit.

Cold coarse meal fed to attrition mill, thence through sharp rolls. Bran is rejected at this point and fines are fed to stone burr mill. Material from burr mill bolted through eighty mesh cloth and flour passing this eighty mesh cloth is the "semi-processed flour" product.

Semi-processed flour is fed to four unit steam jacketed heater to first unit of which dry steam is injected as described above. This is an important step which we have discovered and which we claim as part of our soya bean flour preparation process constituting our invention. Semi-processed flour which does not receive this treatment cannot be as advantageously used to make soya bean adhesives, because the adhesives foam when mixed with water and are lacking in adhesive strength and in water resistance. This treatment, which the semi-processed soya bean flour receives in this step, so alters the chemical state of the soya bean protein that it more readily combines with the other ingredients of the various glue formulæ and when the whole is mixed with water, there is little or no foam. The resulting glues have great dry adhesion to cellulose material and marked water resistance.

The heat treated soya bean flour is now cooled and is ready and suitable for use in making adhesives.

We do not wish to limit ourselves to temperatures or exact times as given above in the various steps. We have found in general that any heat over forty degrees centigrade, if of sufficient duration, will effect the coagulation of the protein, for instance, in the desired manner and to the desired degree.

From the results of experiments, we believe that excessive moisture with absence of artificial heat results in coagulation of the protein, which coagulation may be due to reactions which can take place only in presence of excess moisture.

This has been noted in flour made from "round cake" containing moisture up to eighteen percent and effects noted are similar to effects developed by coagulation by heat.

We also find that dry steam has an effect supplemental to heat alone and we use dry steam in conjunction with heat as described. Dry steam has a different effect on the soya bean protein than heat alone.

Further, we do not wish to limit ourselves to ingredients or proportions of ingredients noted herein as examples because they simply illustrate a large number of ingredients, proportions and formulæ, which are the subject matter of co-pending applications.

Further we do not wish to limit ourselves to methods or machinery for grinding used herein for illustration—the reduction of the cake to a finely comminuted flour being the important result.

What we particularly wish herein to point out and to claim as our invention is the important effect on soya bean flour or soya bean protein brought about by heating said flour under controlled conditions before mixing with any chemicals named in co-pending applications, either as dispersing agent substances, assisting in development of water resistance, or spreaders. In other words, we use as a basis in making our new and improved soya bean glue a partly coagulated protein, which coagulation and chemical change is developed by properly controlled heat treatment.

We have found that both in the aging process and in the processing step, (the latter being on flour only), that time and temperatures are inter-related to the extent that if one is increased, the other must be decreased to arrive at the desired results for each of these processes, or to impart the desired condition to the flour in the processing operation and to the flour and the glue ingredients in the aging operation.

We further do not wish it to be inferred that the processing affects only the protein content of the soya bean flour since we believe that it also affects fundamentally the sugars and gums and other ingredients.

We claim:

1. In the process of preparing soya bean protein containing material for the manufacture of an adhesive, the steps of reducing the cake, derived by removing the oil content in whole or in part by pressure or by solvents, to the form of a coarse meal; drying the same; treating in heater to live steam; and storing the product for further gradual processing.

2. The process of preparing soya bean protein containing material for the manufacture of an adhesive comprising reducing the semi-processed cake, derived by heating the beans and removing the oil content in whole or in part by pressure or by solvents, to the form of a coarse meal; heating said meal in rotary drum drier to 172° Fahrenheit; cooling same to 70° Fahrenheit; further comminuting the meal to a flour, eighty-five percent of which will pass an eighty-mesh screen, whereby is eliminated a large portion of the bran and hulls, the said eighty-mesh screen fine material constituting semi-processed flour for adhesive making formulæ; treating said semi-processed flour in heater to live steam; regrinding; cooling; and storing for further gradual processing.

3. In the process of preparing soya bean flour for the manufacture of an adhesive, the steps of heating the same in the presence of live steam until that degree of stickiness is developed, when twenty grams of the steam treated flour and twenty grams of water are intermixed to form a pat, which will be sufficient to pick up and hold for a few seconds a fifty gram brass weight having a contact area of one square inch, and storing for further gradual processing the product.

In witness whereof, we hereunto subscribe our names this 21st day of May, 1926.

LEO W. EILERTSEN.
CHARLES N. CONE.
GLENN DAVIDSON.
IRVING F. LAUCKS.
HARRY P. BANKS.